April 18, 1939.  S. E. McFARLAND  2,154,690
BRAKE
Filed Oct. 13, 1937  2 Sheets-Sheet 1

Inventor
SAMUEL E. McFARLAND
By
His Attorney

April 18, 1939.  S. E. McFARLAND  2,154,690
BRAKE
Filed Oct. 13, 1937  2 Sheets-Sheet 2

Inventor
Samuel E. McFarland
By
His Attorney

Patented Apr. 18, 1939

2,154,690

UNITED STATES PATENT OFFICE 2,154,690

BRAKE

Samuel E. McFarland, Los Angeles, Calif.

Application October 13, 1937, Serial No. 168,740

6 Claims. (Cl. 188—91)

This invention relates to brake mechanisms and it is a general object of this invention to provide an improved and particularly effective brake.

The brakes now in general use on hoisting drums, automotive vehicles, railway car wheels, etc., are of the friction type embodying steel bands, woven friction lining, or cast iron shoes as the braking elements. These friction elements are subjected to much wear and, therefore, are difficult to keep in proper adjustment and require early replacement.

An object of this invention is to provide a brake that is subject to little or no wear and that does not require regulation or adjustment.

Another object of this invention is to provide a brake that does not embody friction bands, friction shoes, friction lining or any other parts that operate through frictional contact with other elements to produce a braking action.

Another object of this invention is to provide a brake that embodies cylinder and piston units carried by one of the relatively rotating parts and a cam ring carried by the other part and cooperating with the cylinder and piston units through anti-friction means and means for controlling the flow or movement of fluid handled by the cylinder and piston units to effect a braking action.

Another object of this invention is to provide a brake means of the character mentioned that provides a smooth, positive braking action.

A further object of this invention is to provide a brake means of the character mentioned that is adapted for embodiment in forms for use on various classes of vehicles, machines, etc.

Figure 1:
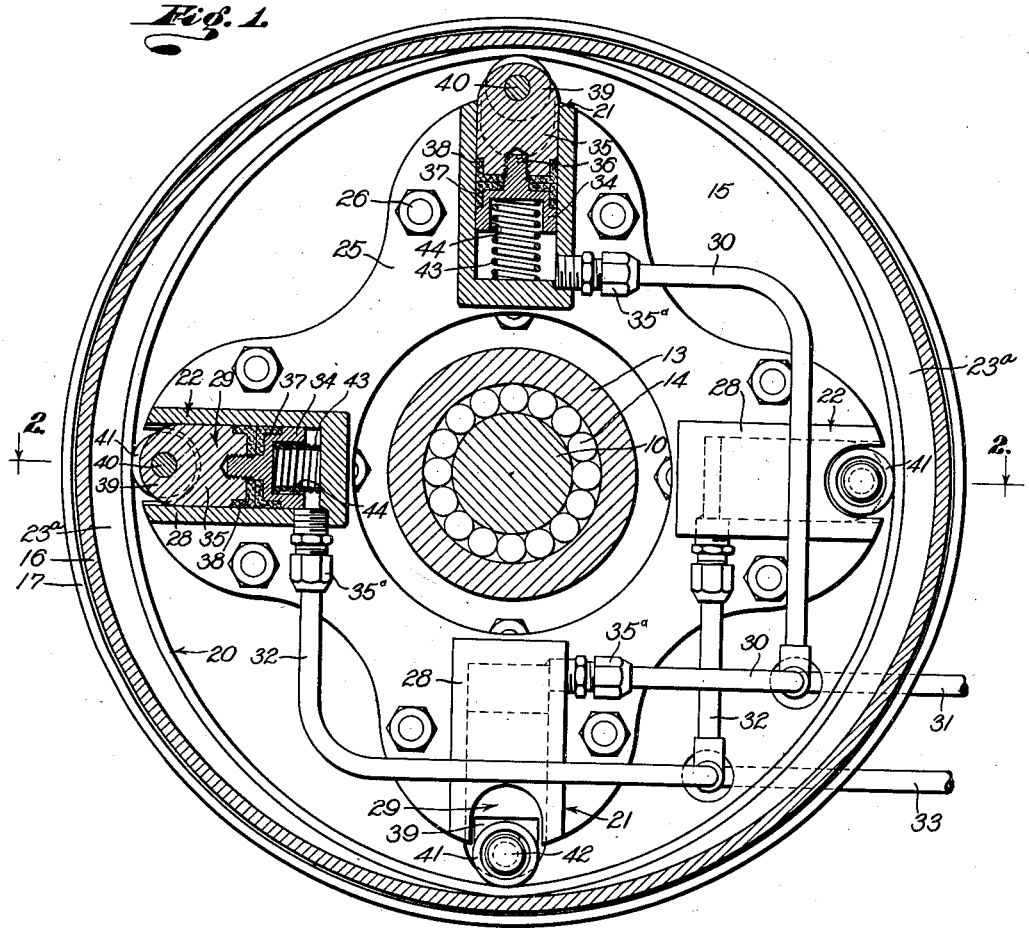
Figure 2:
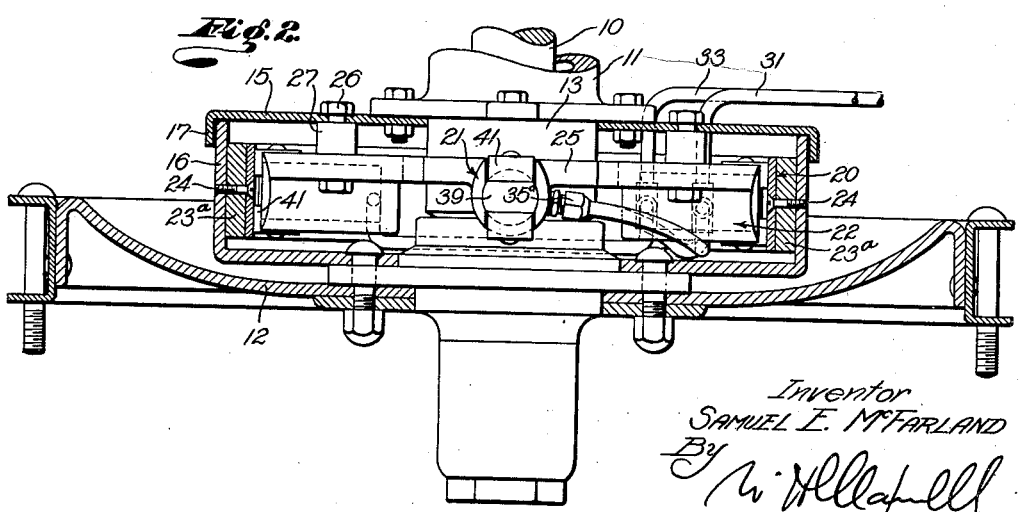
Figure 3:
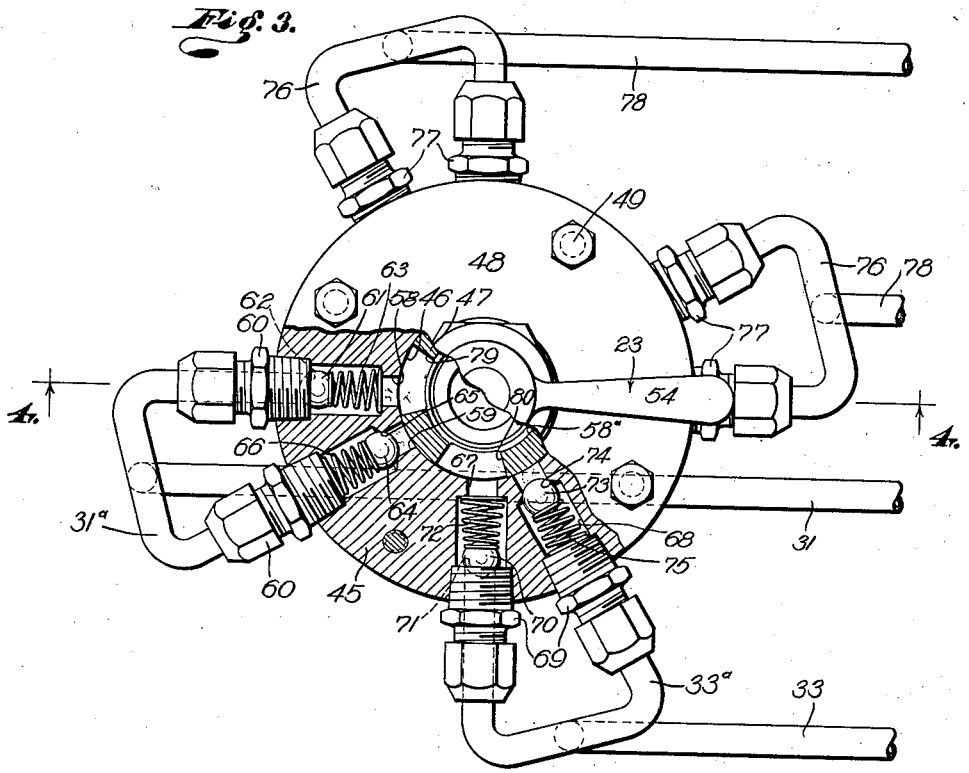
Figure 4:
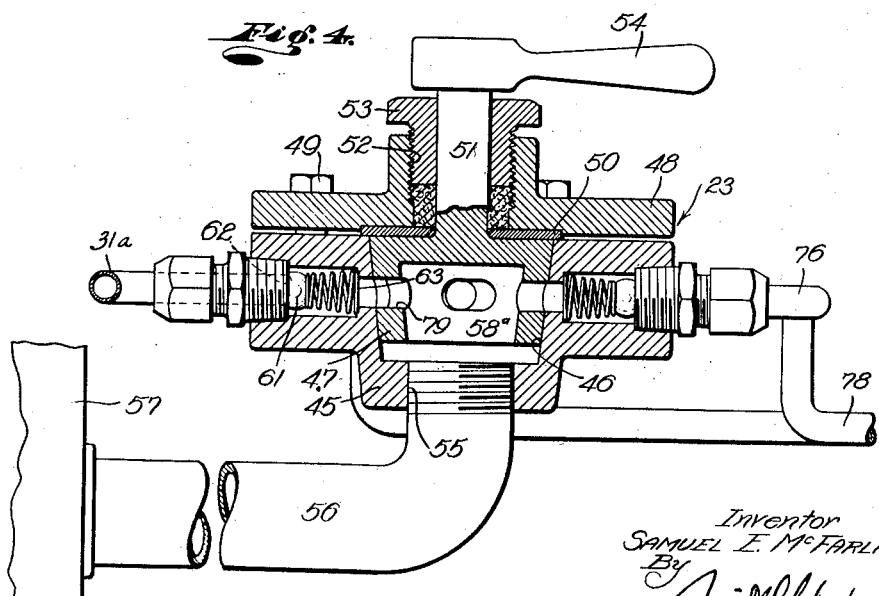

The various objects and features of my invention will be fully understood from the following detailed description of a typical, preferred form and application of the invention, throughout which description reference is made to the accompanying drawings, in which:

Fig. 1 is an end elevation of one form of brake means of the present invention in the operative position within the brake drum on a vehicle wheel, with certain parts broken away to illustrate two of the cylinder and piston units in cross section. Fig. 2 is a reduced axial sectional view taken substantially as indicated by line 2—2 on Fig. 1 illustrating the assembly illustrated in Fig. 1 in edge or side elevation. Fig. 3 is a plan view of the control means for the brake mechanism with a portion broken away to illustrate certain parts in horizontal cross section, and Fig. 4 is a vertical or longitudinal detailed sectional view of the control means taken substantially as indicated by line 4—4 on Fig. 3.

The present invention may be embodied in forms for use on various types and classes of devices and on vehicles of different forms. In the following detailed description I will describe a simple, preferred form of the invention for use on an automotive vehicle such as an automobile, truck, or the like. It is to be understood that the invention is not to be construed as limited or restricted to the specific form or application about to be described, but that it is to be taken as including any features that may fall within the scope of the claims. In the drawings I have illustrated the brake mechanism for one wheel of the vehicle and a control for governing the brakes of two wheels. It is believed that it will be understood that the brakes for the several wheels may be substantially identical and that the control may be modified to govern any number of separate brake units or brakes.

The portion of the vehicle illustrated in the drawings includes an axle 10 which may be considered as a driven or rotating axle and a housing 11 surrounding the axle. A wheel 12 is keyed or otherwise secured to the outer end part of the axle 10 in the usual manner. The housing 11 carries a bearing case 13 containing the usual bearing 14 for supporting the axle 10. A plate 15 is rigidly secured to the housing at the inner end of the bearing case 13. The usual brake drum 16 is secured to the inner side of the wheel 12 and surrounds the bearing case 13. The inner edge portion of the drum 16 is freely received in a flange 17 on the plate 15.

The improved brake means of the present invention includes, generally, a cam ring 20 secured to one of two relatively rotatable parts of the vehicle, sets or pairs of cylinder and piston units 21 and 22 on the other part of the vehicle for cooperating with the cam ring 20 and a remote control 23 for the cylinder and piston units 21 and 22.

The cam ring 20 may be carried by a relatively stationary part such as the housing 11 to be engaged by the cylinder and piston units 21 and 22 carried by the rotating wheel 12. In the arrangement illustrated in the drawings the cam ring 20 surrounds the series of units 21 and 22 and is secured to the brake drum 16 on the wheel 12 while the cylinder and piston units 21 and 22 are carried by the relatively stationary housing 11. The ring 20 is a substantially annular member or continuous member arranged within the drum 16. In accordance with the invention the cam ring 20 is elliptical in end or edge elevation and its internal surface preferably has the configuration of a symmetrical or true ellipse. The cam ring 20 may be secured in the drum 16 in any suitable manner. In the particular case illustrated in the drawings the ring 20 has its external surface adjacent or in contact with the internal surface of the drum 16 at its plane of greatest diameter and substantially crescent shaped fillers or blocks 23a are interposed between the interior of the drum 16 and the other surface portions of the cam ring. The blocks 23a may be bolted or riveted to the drum 16 and the ring 20 may be secured to the blocks 23a by screws 24, or the like. The connection of the cam ring 20 with the blocks 23a is preferably such that the ring may be removed for replacement when necessary. The blocks 23a serve to back up or support the ring 20 and prevent undesirable flexing of the ring.

The cylinder and piston units 21 and 22 are governed by the control 23 and are adapted to cooperate with the ring 20 to effect a braking action. The cylinder and piston units 21 and 22 are preferably provided in sets or pairs and the means for supporting the plurality of units may comprise a plate or web 25. The web 25 surrounds the bearing case 13 and may be secured to the plate 15 by bolts 26. Spacers 27 may be provided on the bolts 26 to maintain the web 25 in spaced relation to the plate 15. The web 25 is shaped to support the cylinder and piston units 21 and 22 in circumferentially spaced relation.

The cylinder and piston units 21 and 22 may be identical and I will employ corresponding reference numerals on the corresponding parts of the several units. In the particular form of the invention disclosed in the drawings there are two diametrically opposite cylinder and piston units 21 and two diametrically opposite cylinder and piston units 22. Each of the units 21 and 22 includes a cylinder 28 and a piston 29. The units 21 and 22 are spaced substantially 90° apart. It is to be understood that in some installations it may be desirable or necessary to employ more or less cylinder and piston units. The cylinders 28 of the units 21 and 22 may be formed integral with the web 25 and the cylinders of the several units are preferably positioned on the same side of the web. While the cylinders 28 are stationary in the structure illustrated it is to be understood that they may be reciprocable relative to the pistons 29. The cylinders 28 are arranged radially relative to the axis of rotation of the axle 10 and their outer ends are open to receive the pistons 29 of the units. Conduits 30 communicate with the inner ends of the cylinders 28 of the units 21 and merge with a single pipe 31. Similar conduits 32 communicate with the inner ends of the cylinders 28 of the units 22 and merge with a single pipe 33. The pipes 31 and 33 extend to the control 23 which will be hereinafter described. Suitable fittings 35a may connect the conduits 30 and 32 with the cylinders 28.

The pistons 29 of the units 21 and 22 are reciprocable in the cylinders 28 and carry antifriction means for cooperating with the cam ring 20. The pistons 29 are preferably sectional, each comprising an inner section 34 and an outer section 35. Stems 36 are provided on the inner sections 34 and thread into openings in the outer sections 35 to connect the sections. Oppositely facing cup leathers 37 and 38 are arranged on the stems 36 and are clamped together between the opposing ends of the sections 34 and 35. The cup leathers 37 are positioned to prevent the leakage of fluid outwardly around the pistons 29 while the cup leathers 38 are arranged to prevent the inward leakage of air around the pistons when reduced pressures are created in the cylinders 28.

A lug 39 is provided on the outer end of each piston 29 and a pin 40 passes through a transverse or diametric opening in each lug 39. Antifriction rollers 41 are rotatably supported on the projecting opposite end portions of the pins 40. The opposite ends of the pins 40 are provided with heads 42 to prevent the loss or displacement of the rollers 41 from the pins. The rollers 41 rotatably supported on the outer ends of the pistons 29 are adapted to cooperate with or roll along on the internal surface of the elliptical cam ring 20. Spring means are provided to normally urge the pistons 29 outwardly in the cylinders 28. Coiled springs 43 are arranged under compression between the inner ends of the pistons 29 and the inner walls of the cylinders 28. Sockets 44 are preferably provided in the inner ends of the pistons 29 to center the springs 43 and to receive the springs when the pistons are in their innermost positions.

The control 23 may be arranged at any desired location; for example, where the brake mechanism is embodied in a vehicle the control 23 may be positioned in the driver's compartment of the vehicle. Further, in accordance with the broader aspects of the invention the control 23 may be pedal operated or lever operated or may be operated by a suitable remote control. In the particular form of the invention disclosed in the drawings the control 23 is a lever operated valve means.

The control 23 includes a valve body 45 having a central tapered opening 46 for receiving a correspondingly tapered turnable core or plug 47. A cap 48 is secured to the valve body 45 by bolts or screws 49 and extends across the upper end of the opening 46. A gasket 50 may be arranged between the under side of the cap 48 and the upper ends of the body 45 and the plug 47. The turnable valve plug 47 is provided with an upwardly or outwardly projecting stem 51 extending outwardly through an opening 52 in the cap 48. A suitable packing gland 53 may be provided in the opening 52 to seal about the valve stem 51. A suitable lever or handle 54 is secured to the projecting outer portion of the stem 51 to facilitate the manual turning of the valve plug 47. A main fluid inlet port 55 is provided in the body 45 and communicates with the lower or inner end of the opening 46. A pipe 56 is provided to conduct a suitable fluid such as oil from a reservoir 57 to the port 55. The fluid is preferably contained in the reservoir 57 under suitable pressure. The inner portion of the plug 47 has a central socket 58a which is open to the opening 46 and the pipe 56.

The above described pipes 31 and 33 communicating with the cylinder manifolds or conduits 30 and 32, respectively, extend to points adjacent the control 23. The pipe 31 communicates with a manifold 31a and the pipe 33 communicates with a manifold 33a. The manifold 31a has two branches, one communicating with a port 58 in the valve body 45 and the other communicating with a similar port 59. Suitable fittings 60 connect the branches of the manifold 31a with the body 45 to communicate with the ports 58 and 59. The ports 58 and 59 extend inwardly through the valve body 45 to communicate with the opening 46. The ports 58 and 59 are preferably radial with respect to the opening 46 and their inner ends are in spaced adjacent relation. A check valve is provided to control the port 58. This valve may include a ball 61 adapted to seal outwardly against a seat 62 on the inner end of the fitting 60 which maintains one branch of the manifold 31ª in communication with the port 58. A spring 63 is arranged between the ball 61 and a shoulder on the wall of the port 58 to urge the ball to its closed position against the seat 62. A check valve is provided to control the port 59. The valve in the port 59 may include a ball 64 adapted to seal inwardly against a seat 65 on the wall of the port 59. A spring 66 is arranged under compression between the ball 64 and the inner end of the adjacent fitting 60 to urge the ball to its closed position. It is preferred to maintain the level of the liquid in the reservoir above the level of the manifolds 31ª and 33ª.

The manifold 33ª has two branches, one of which communicates with a port 67 in the body 45 and the other of which communicates with a port 68 in the body 45. The ports 67 and 68 extend inwardly in the body 45 to have their inner ends in communication with the opening 46. The ports 67 and 68 are preferably radial relative to the opening 46 and their inner ends are in spaced adjacent relation. Suitable fittings 69 connect the branches of the manifold 33ª with the body 45 to communicate with the ports 67 and 68. The port 67 is controlled by a valve which may comprise a ball 70 for sealing outwardly against a seat 71 on the inner end of the adjacent fitting 69. A spring 72 is arranged under compression between the ball 70 and a shoulder on the wall of the port 67 to urge the ball to its closed position. A check valve is provided to control the port 68. This valve may include a ball 73 for sealing inwardly against a valve seat 74 on the wall of the port 68. A spring 75 is arranged under compression between the ball 73 and the inner end of the adjacent fitting 69 to urge the ball to its closed position.

The sets or pairs of adjacent ports 58 and 59 and 67 and 68 are circumferentially spaced in the valve body 45 and I have illustrated two spaced manifolds 76 connected with the valve body 45 by fittings 77 to have communication with ports therein similar to the sets of ports 58 and 59 and 67 and 68 just described. Pipes 78 communicate with the manifolds 76 and may be considered as extending to a separate brake of the character illustrated in Figs. 1 and 2. It is to be understood that the control 23 may be provided with sets of valved ports and manifolds to provide for the control of any number of separate brakes. In the case where there are four manifolds 31ª, 33ª, and 76 connected with the ports of the valve body 45 it is preferred to circumferentially space the manifolds so that the sets of ports are in substantially diametrically opposite relation.

The plug 47 is provided to control the sets of ports 58 and 59 and 67 and 68 and the ports (not shown) communicating with the manifolds 76. A port 79 is provided in the wall of the plug 47 to communicate with the ports 58 and 59 and a similar port 80 is provided in the wall of the plug 47 to communicate with the ports 67 and 68. It is to be understood that the plug 47 is provided with ports similar to the ports 79 and 80 for communicating with the ports with which the manifolds 76 are connected. The ports 79 and 80 extend through the wall of the plug 47 from its socket 58ª to its periphery and are located so that their outer ends are movable into and out of registration with the adjacent sets of ports 58 and 59 and 67 and 68. The ports 79 and 80 are of sufficient circumferential extent to simultaneously register with the ports 58 and 59 and 67 and 68, respectively.

In operation it will be assumed that the wheel 12 is rotating with respect to the web 25 and the parts thereon. The cam ring 20 being arranged as described above rotates with the wheel 12 and is adapted to cooperate with the rollers 41 on the pistons 29 to effect reciprocation of the pistons. It is believed that it will be readily understood how the rotating elliptical cam ring 20 operates the pistons 29, it being observed that the pistons 29 in the units 21 are in their full out positions when the pistons 29 of the units 22 are in their innermost positions and that this relationship is reversed when the ring 20 reaches a position 90° from that illustrated in Fig. 1 of the drawings. Accordingly, the pistons 29 of the units 21 are reciprocated in unison and the pistons of the units 22 are reciprocated in unison but in opposite directions from the pistons of the units 21.

Under normal conditions when it is desired to allow the wheel 12 to rotate freely the valve plug 47 is in the position illustrated in Fig. 3 of the drawings where the port 79 is in full communication with the port 58 and is out of communication with the port 59 and the port 80 is in full communication with the port 67 and out of communication with the port 68. With the valve plug 47 in this position the first inward movement of the pistons 29 of the several units 21 and 22 forces fluid from the cylinders 28 through the conduits 30 and 32, the pipes 31 and 33, and the manifolds 31ª and 33ª. This fluid under pressure unseats the balls 61 and 70 and discharges from the ports 58 and 67 into the plug 47 to return to the reservoir 57. The ports 59 and 68 are closed by the plug 47 and the ports 58 and 67 are closed by the balls 61 and 70, respectively, and the pistons 29 are restrained against outward movement by the reduced pressures at their inner ends. Accordingly, although the springs 43 may urge the pistons 29 outwardly the pistons may not move outwardly against the cam ring 20.

When it is desired to actuate the brakes the valve plug 47 is turned to a position where the port 79 is brought into registration with the ports 59 and 58 and the port 80 is brought into registration with the ports 68 and 67. This, of course, admits the fluid to the inner ends of the cylinders 28 and the cam ring 20 causes reciprocation of the pistons as described above. The inward movement of the pistons 29 in the cylinders 28 may be retarded or governed to effect the desired braking action by moving the plug 47 to a position where the port 79 is in only partial communication with the port 58 and the port 80 is in only partial communication with the port 67. This positioning of the plug 47 results in controlled discharge of fluid from the cylinders 28 so that the inward movement of the pistons 29 by the cam ring 20 is retarded. It is to be understood that the valve plug 47 may be manually shifted and adjusted as required to produce the desired smooth braking action.

It is to be noted that the rollers 41 on the pistons 29 merely roll around on the internal surface of the cam ring 20 so that the braking action is accompanied by a minimum of friction and wear. When the ports 58 and 67 are fully closed the inward movement of the pistons 29 is positively prevented so that relative rotation between the wheel 12 and the web 25 carried by the housing 11 is stopped or prevented. The improved brake means provided by the present invention assures a smooth uniform braking action with a minimum of friction and wear. The active braking parts or elements of the mechanism do not require repeated adjustment and are very long wearing.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A brake for use in combination with a relatively stationary part and a rotating part comprising a unit secured to one of said parts and including two relatively reciprocable elements, one a cylinder, the other a piston in the cylinder, a cam ring secured to the other of said parts and cooperable with one of said elements to effect relative reciprocation between the elements, means containing a supply of fluid, a conduit communicating with the cylinder, and valve means for controlling said unit whereby the cooperation between the cam ring and the said element may resist relative rotation between the parts, the valve means including a body having an opening in communication with the fluid containing means and a pair of ports communicating with the said conduit, a manually movable valve member for controlling communication between said ports and the opening, an outwardly closing check valve controlling one of said ports and an inwardly closing check valve controlling the other of said ports.

2. A brake for use in combination with a relatively stationary part and a rotating part comprising a unit secured to one of said parts and including two relatively reciprocable elements, one a cylinder, the other a piston in the cylinder, a cam ring secured to the other of said parts and cooperable with one of said elements to effect relative reciprocation between the elements, a spring urging said part into cooperation with the cam ring, means containing a supply of fluid, a conduit communicating with the cylinder, and valve means remote from said unit for controlling said unit whereby the cooperation between the cam ring and the said element may resist relative rotation between the parts, the valve means including a body having an opening in communication with the fluid containing means and a pair of ports communicating with the said conduit, a manually movable valve member for controlling communication between said ports and the opening, an outwardly closing check valve controlling one of said ports and an inwardly closing check valve controlling the other of said ports.

3. A brake for use in combination with a relatively stationary part and a rotating part comprising a plurality of spaced units on one of said parts, each comprising a relatively stationary element, and a reciprocable element, one of said elements being a cylinder, the other a piston in the cylinder, a cam ring secured to the other part and cooperable with the reciprocable elements to reciprocate the same, springs urging the pistons outwardly to engage the cam ring, conduits for passing fluid to and from the cylinders, and valve means controlling the conduits operable to prevent the flow of fluid to the cylinders to maintain the pistons retracted against the action of the springs and operable to retard the flow of fluid from the cylinders to thereby resist rotation of the rotatable part.

4. A brake for use in combination with a relatively stationary part and a rotating part comprising a plurality of spaced units on one of said parts, each comprising a relatively stationary element, and a reciprocable element, one of said elements being a cylinder, the other a piston in the cylinder, a cam ring secured to the other part and cooperable with the reciprocable elements to reciprocate the same, springs urging the pistons outwardly to engage the cam ring, conduits for passing fluid to and from the cylinders, and valve means controlling the conduits operable to prevent the flow of fluid to the cylinders to maintain the pistons retracted against the action of said springs and operable to retard the flow of fluid from the cylinders to thereby resist rotation of the rotatable part, said valve means consisting of a single manually operable valve remote from the said parts.

5. In combination with a relatively stationary part and a rotatable part, a plurality of circumferentially spaced units carried by the said stationary part and each including two relatively reciprocable elements, one a cylinder, the other a piston in the cylinder, a cam ring secured to said rotatable part and cooperating with the reciprocable elements to reciprocate the same, a means containing a supply of fluid, a conduit communicating with each cylinder, and valve means for connecting the conduits with the fluid supply means and operable to control flow through the conduits, the valve means including a body having an opening in communication with the fluid supply means, and pairs of ports, each of said conduits being in communication with one pair of ports, a manually movable valve member for controlling communication between said ports and the opening, an outwardly closing check valve controlling one port of each pair, and an inwardly closing check valve controlling the other port of each pair.

6. In combination with a relatively stationary part and a rotatable brake drum, a plurality of circumferentially spaced units carried by the said stationary part and each including two relatively reciprocable elements, one a cylinder, the other a piston in the cylinder, a cam secured in the drum and having an elliptical internal surface cooperating with the reciprocable elements to reciprocate the same, a means containing a supply of fluid, a conduit communicating with each cylinder, and valve means for connecting the conduits with the fluid supply means and operable to control flow through the conduits, the valve means including a body having an opening in communication with the fluid supply means, and pairs of ports, each of said conduits being in communication with one pair of ports, a manually movable valve member for controlling communication between said ports and the opening, an outwardly closing check valve controlling one port of each pair, and an inwardly closing check valve controlling the other port of each pair.

SAMUEL E. McFARLAND.